US010733710B2

(12) United States Patent
Chen et al.

(10) Patent No.: US 10,733,710 B2
(45) Date of Patent: Aug. 4, 2020

(54) SYSTEM AND METHOD FOR DRAWING BEAUTIFICATION

(71) Applicant: Microsoft Technology Licensing, LLC, Redmond, WA (US)

(72) Inventors: Tianyi Chen, Baltimore, MD (US); Xiao Tu, Medina, WA (US); Sheng Yi, Bellevue, WA (US); Kyle Thomas Beck, Redmond, WA (US); Reed L. Townsend, Kirkland, WA (US); Megan L. Fu, Cambridge, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 315 days.

(21) Appl. No.: 15/846,963

(22) Filed: Dec. 19, 2017

(65) Prior Publication Data

US 2019/0188831 A1     Jun. 20, 2019

(51) Int. Cl.
*G06T 5/00*     (2006.01)
*G06T 7/13*     (2017.01)
*G06T 11/20*     (2006.01)

(52) U.S. Cl.
CPC ............... *G06T 5/005* (2013.01); *G06T 7/13* (2017.01); *G06T 11/203* (2013.01); *G06T 2207/20072* (2013.01); *G06T 2207/20084* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 4,058,849 A | * | 11/1977 | Fitzgerald | G06T 11/206 358/1.2 |
| 4,945,498 A | * | 7/1990 | Mitamura | G06T 11/206 345/441 |
| 6,999,907 B2 | * | 2/2006 | Smith | G06F 17/5004 703/1 |

(Continued)

OTHER PUBLICATIONS

Murugappan, et al., ("FEASY: A Sketch-based Interface Integrating Structural Analysis in Early Design", In Proceedings of the ASME 2009 International Design Engineering Technical Conference and Computers and Information in Engineering Conference, Aug. 30, 2009, pp. 1-10. IDETC/CIE 2009). Cited in IDS (Year:2009).*

(Continued)

*Primary Examiner* — Anand P Bhatnagar
(74) *Attorney, Agent, or Firm* — Fiala & Weaver P.L.L.C.

(57) ABSTRACT

Methods, systems, and apparatuses for beautifying raw drawing data include a beautification engine having a raw data processor that receives the drawing data and identifies a set of segments in the data. A beautification director constructs a structural representation of the set of segments data that specifies a topological relationship between the segments. A single primitive beautifier identifies a segment in the structural representation to be beautified and a single primitive beautification action is applied to the segment to generate beautified raw drawing data. A multiple primitive beautifier identifies adjacent segments in the structural representation to be beautified and a multiple beautification action is applied to the adjacent segments to generate further beautified drawing data.

20 Claims, 15 Drawing Sheets

(56) References Cited

U.S. PATENT DOCUMENTS

| | | | | |
|---|---|---|---|---|
| 9,098,191 | B2* | 8/2015 | Gulwani | G06F 3/04883 |
| 2002/0035408 | A1* | 3/2002 | Smith | G06F 17/5004 |
| | | | | 700/97 |
| 2002/0113784 | A1* | 8/2002 | Feilmeier | G06F 1/1626 |
| | | | | 345/419 |
| 2003/0204279 | A1* | 10/2003 | Yokohari | G05B 19/4097 |
| | | | | 700/98 |
| 2004/0174358 | A1* | 9/2004 | Takagi | G06T 17/10 |
| | | | | 345/420 |
| 2005/0119779 | A1* | 6/2005 | Amico | G06K 9/481 |
| | | | | 700/132 |
| 2006/0171592 | A1* | 8/2006 | Amico | G06K 9/481 |
| | | | | 382/203 |
| 2006/0227130 | A1* | 10/2006 | Elchuri | G06T 11/203 |
| | | | | 345/419 |
| 2006/0227140 | A1* | 10/2006 | Ramani | G06K 9/00416 |
| | | | | 345/441 |
| 2009/0284550 | A1* | 11/2009 | Shimada | G06F 17/5095 |
| | | | | 345/619 |
| 2010/0171754 | A1* | 7/2010 | Hatfield | G06F 17/242 |
| | | | | 345/619 |
| 2012/0141032 | A1* | 6/2012 | Ouyang | G06K 9/00422 |
| | | | | 382/187 |
| 2014/0313216 | A1* | 10/2014 | Steingrimsson | G06K 9/00402 |
| | | | | 345/589 |
| 2016/0351170 | A1* | 12/2016 | Asente | G06T 11/203 |

OTHER PUBLICATIONS

Murugappan, et al., "FEAsy:A Sketch-based Interface Integrating Structural Analysis in Early Design", In Proceedings of the ASME International Design Engineering Technical Conference and Computers and Information in Engineering Conference, Aug. 30, 2009, pp. 1-10.

Wolin, et al., "ShortStraw: A Simple and Effective Corner Finder for Polylines", In Proceedings of the Fifth Eurographics conference on Sketch-Based Interfaces and Modeling, Jun. 11, 2008, 8 Pages.

Chen, et al., "Analysis of Stroke Intersection for Overlapping PGF Elements", In Workshop of 2016 12th IAPR Workshop on Document Analysis Systems (DAS), Apr. 11, 2016, 6 Pages.

"International Search Report and Written Opinion Issued in PCT Application No. PCT/US18/062933", dated Feb. 22, 2019, 12 Pages.

* cited by examiner

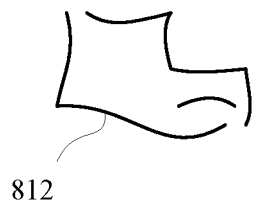
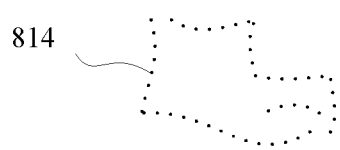
FIG. 8A  FIG. 8B
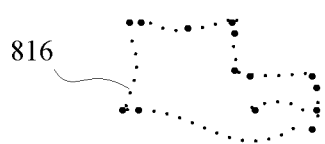
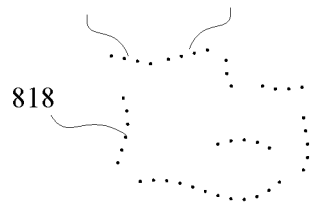
FIG. 8C  FIG. 8D
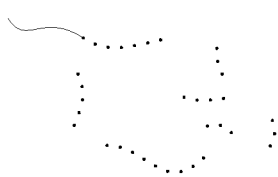
FIG. 8E

SYSTEM AND METHOD FOR DRAWING BEAUTIFICATION

BACKGROUND

Many computer-aided drawing programs allow users to draw on a digital canvas in a convenient freeform manner that displays the raw drawing strokes input by the user on the digital drawing canvas. Often, the user may prefer that their input drawing strokes be improved or altered to more accurately correspond to a desired regular form or basic geometric shape such as a line, triangle or rectangle. Existing solutions for improving drawing strokes classify the users input raw drawing strokes into known geometric objects like triangles, rectangles, pentagons, etc. and then render an idealized representation of the objects they believe the user is trying to create onto the screen. However, real world drawings are often freeform and comprised of numerous geometric primitives that do not readily correspond to recognizable and definable basic geometric shapes.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses for beautifying raw drawing data are disclosed herein. In one aspect, a beautification engine includes a raw data processor that receives drawing data and identifies a set of segments in the data. A beautification director constructs a structural representation of the set of segments data that specifies a topological relationship between the segments. For example, the structural representation may be an undirected graph that represents each segment with a vertex, and indicates for each vertex any other vertexes representing adjacent segments. A single primitive beautifier identifies a segment in the structural representation to be beautified and a single primitive beautification action is applied to the identified segment to generate beautified raw drawing data. A multiple primitive beautifier identifies adjacent segments in the structural representation to be beautified, and a multiple beautification action is applied to the identified adjacent segments to generate further beautified drawing data. The beautification process may be performed in an ordered manner to globally beautify the drawing data.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 8A-8E show drawing screens with examples of segment identification in accordance with embodiments.

Figure 1A:
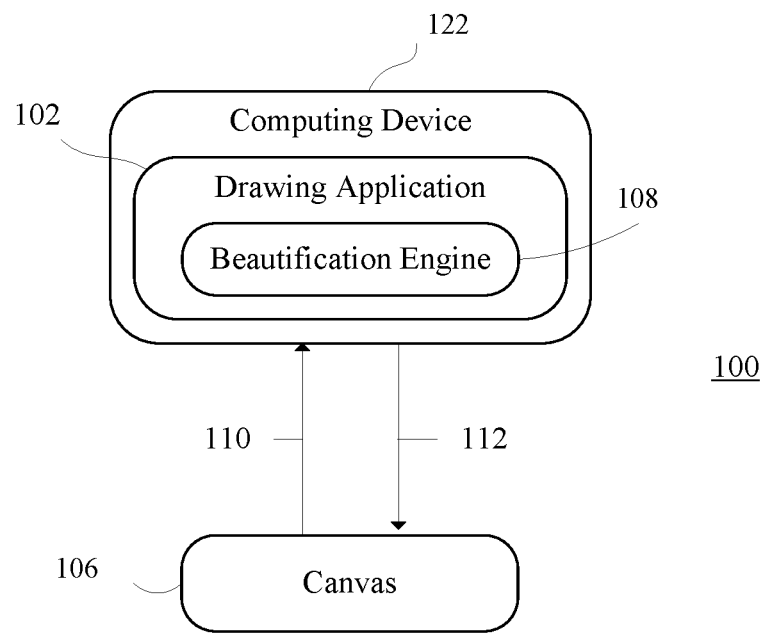
FIGS. 1A and 1B show block diagrams of beautification systems in accordance with example embodiments.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification and accompanying drawings disclose one or more embodiments that incorporate the features of the disclosed subject matter. The scope of the present patent application is not limited to the disclosed embodiments. The disclosed embodiments are merely exemplary, and modified versions of the disclosed embodiments are also encompassed. Embodiments of the present subject matter are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes, and are not limiting. The examples described herein may be adapted to any type of drawing beautification system or configuration. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

Embodiments are described herein of beautification systems and methods that transform input drawing strokes into formalized representations that can be interpreted and beautified in a more meaningful manner. Problems exist with beautifying raw drawing data, including achieving global beautification, as well as determining a manner in which to apply beautification actions. To handle the above problems, embodiments structure the processing of drawing data in a particular manner. For instance, in embodiments, one or more of the following steps may be performed: (i) a data processing step wherein segments representing geometric primitives in the raw data are identified; (ii) a constructing undirected graph step wherein one or more undirected graphs that represent the segments as vertexes either adjacent to or not adjacent to other vertexes are constructed; (iii) a single geometric primitive beautification step where single geometric primitives are beautified; and (iv) a multiple geometric primitives beautification step where multiple adjacent geometric primitives are beautified with respect to each other. In general, data processing may be performed on input raw drawing strokes to obtain a set of basic low-level geometric primitives. The undirected graph(s) are built to represent the whole basic geometric primitives and preserve global drawing information. The topology of the undirected graph(s) may be followed to perform single and multiple geometric primitives beautification on the identified primitives and determine the manner and order in which the geometric primitives are beautified with respect to each other. A result of the beautification process is globally beautified drawing data.

Systems for drawing beautification may be configured in various ways, in embodiments. For instance, FIG. 1A is a block diagram of a beautification system 100, according to an example embodiment. Beautification system 100 is configured to automatically improve drawings made by users on an electronic canvas 106 using computer aided drawing or graphics applications. As shown in FIG. 1A, the beautification system 100 includes a computing device 122 and an electronic canvas 106. Computing device 122 includes a drawing application 102, which includes a beautification engine 108. These features of FIG. 1A are described as follows.

Electronic canvas 106 receives raw drawings strokes input by a user of the canvas 106. Canvas 106 may be part of a drawing or graphics application that allows a user to enter free form sketches, and may be displayed and interacted with by a user as part of a display screen/drawing screen. The user may use a stylus, a fingertip, and/or other instrument to interact with canvas 106 to provide the raw drawing strokes. The canvas 106 provides the raw data strokes in the form of raw drawing stroke data 110 to drawing application 102. Raw drawing stroke data 110 represents the raw drawing strokes in digitized form, such as in the form of drawing screen coordinates, vectors, pixels, and/or any other suitable graphics data.

Drawing application 102 is a drawing or graphics application that operates in computing device 122, enables users to sketch on digital canvas 106, and internally processes raw drawing stroke data 110 to generate beautified drawing results for display on canvas 106. Digital canvas 106 may be displayed on a display screen associated with computing device 122, including a display screen integrated with computing device 122, an external display screen, etc. Drawing application 102 receives raw drawing stroke data 110 from canvas 106 and processes the raw drawing stroke data 110 with beautification engine 108. Beautification engine 108 beautifies the raw drawing strokes based on basic geometric primitive beautification as described in more detail herein and returns beautified drawing stroke data 112 to drawing application 102. Drawing application 102 provides the beautified drawing data 112 to canvas 106. Canvas 106 then displays the beautified strokes.

Computing device 122 may be any type of computing device, including a mobile device such as a mobile computer or mobile computing device (e.g., a Microsoft® Surface® device, a personal digital assistant (PDA), a laptop computer, a notebook computer, a tablet computer such as an Apple iPad™, a netbook, etc.), a smart phone, a wearable computing device (e.g., a head-mounted device including smart glasses such as Google® Glass™, etc.), or other type of mobile device, or a stationary computing device such as a desktop computer, a video game console, or PC (personal computer).

Figure 1B:
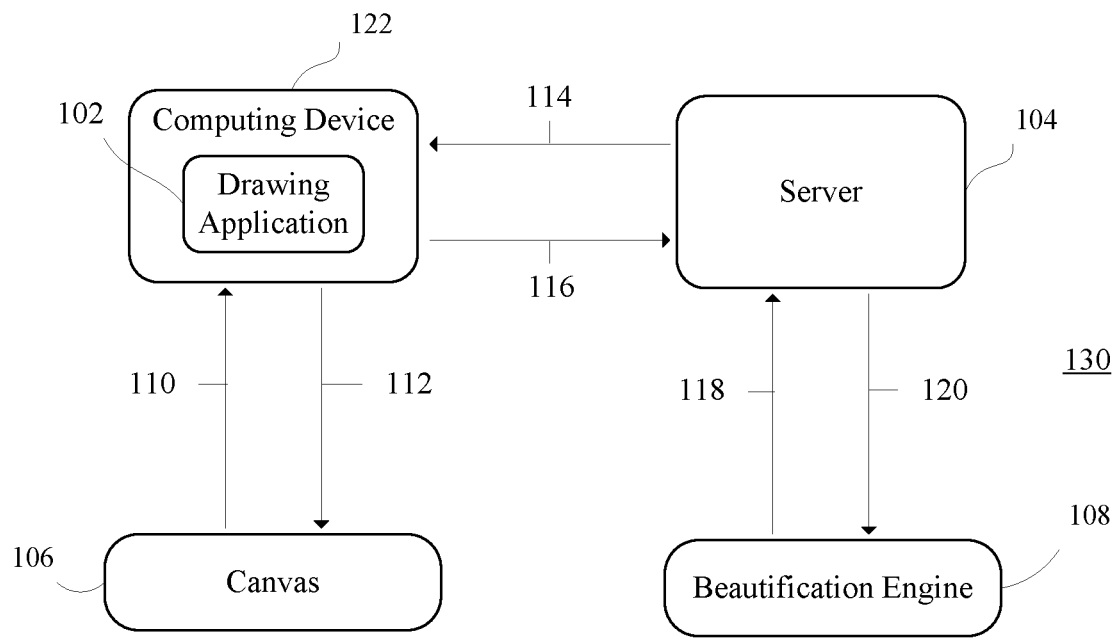

The embodiment of FIG. 1A has beautification engine 108 included in drawing application 102 running on a computing device 122. FIG. 1B shows a block diagram of a beautification system 130 according to another embodiment. Beautification system 130 includes a server 104, electronic canvas 106, beautification engine 108, and computing device 122. Similar to beautification system 100 of FIG. 1A, beautification system 130 is configured to automatically improve drawings made by users on electronic canvas 106 using computer aided drawing or graphics applications. However, in beautification system 130, server 104 receives the drawing data from computing device 122 and communicates the drawing data to beautification engine 108 for beautification processing. beautification system 108 is further described as follows.

As shown in FIG. 1B, drawing application 102 in computing device 122 receives raw drawing stroke data 110 from electronic canvas 106. Drawing application 102 transmits raw drawing stroke data 110 as raw drawing stroke data 116 to server 104 in any manner (e.g., via an HTTP request, or according to another protocol, data format, and/or transport mechanism).

Server 104 enables drawing application 102 to communicate with drawing beautification engine 108. Server 104 may include one or more server devices and/or other types of computing devices. Computing device 122 and server 104 may be communicatively coupled via a network (e.g., a LAN (local area network), a WAN (wide area network), or any combination of networks, such as the Internet). Server 104 may contain beautification engine 108, or may communicate with beautification engine 108 over a network. Server 104 is configured to transmit raw drawing stroke data 120 to beautification engine 108. Beautification engine 108 beautifies the raw drawing strokes as described in more detail herein and, when not contained by server 104, returns beautified drawing stroke data 118 to server 104. Server 104 transmits beautified drawing data 114 to drawing application 102 which provides beautified drawing data 112 to canvas 106. Canvas 106 generates and displays the beautified strokes (along with drawing information that was not beautified), as defined by beautified drawing data 112.

Figure 2:
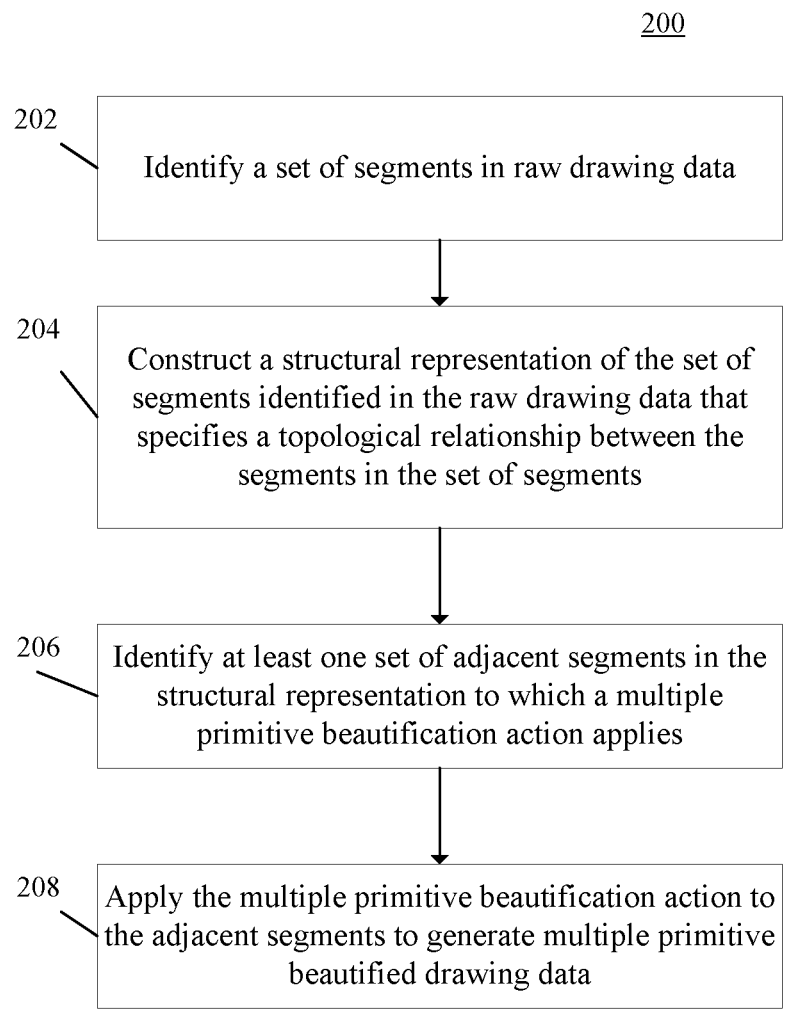
FIG. 2 shows a flowchart of a method of beautifying raw drawing data in accordance with an example embodiment.

Beautification engine 108 may operate in various ways to beautify drawing strokes. For instance, FIG. 2 shows a flowchart 200 of a method of beautifying raw drawing data in accordance with an example embodiment. Flowchart 200 may be performed by beautification engine 108 of FIGS. 1A and 1B in an embodiment. Note that not all steps of flowchart 200 need be performed in all embodiments, and the steps of flowchart 200 may be performed in alternative orders.

Figure 3:
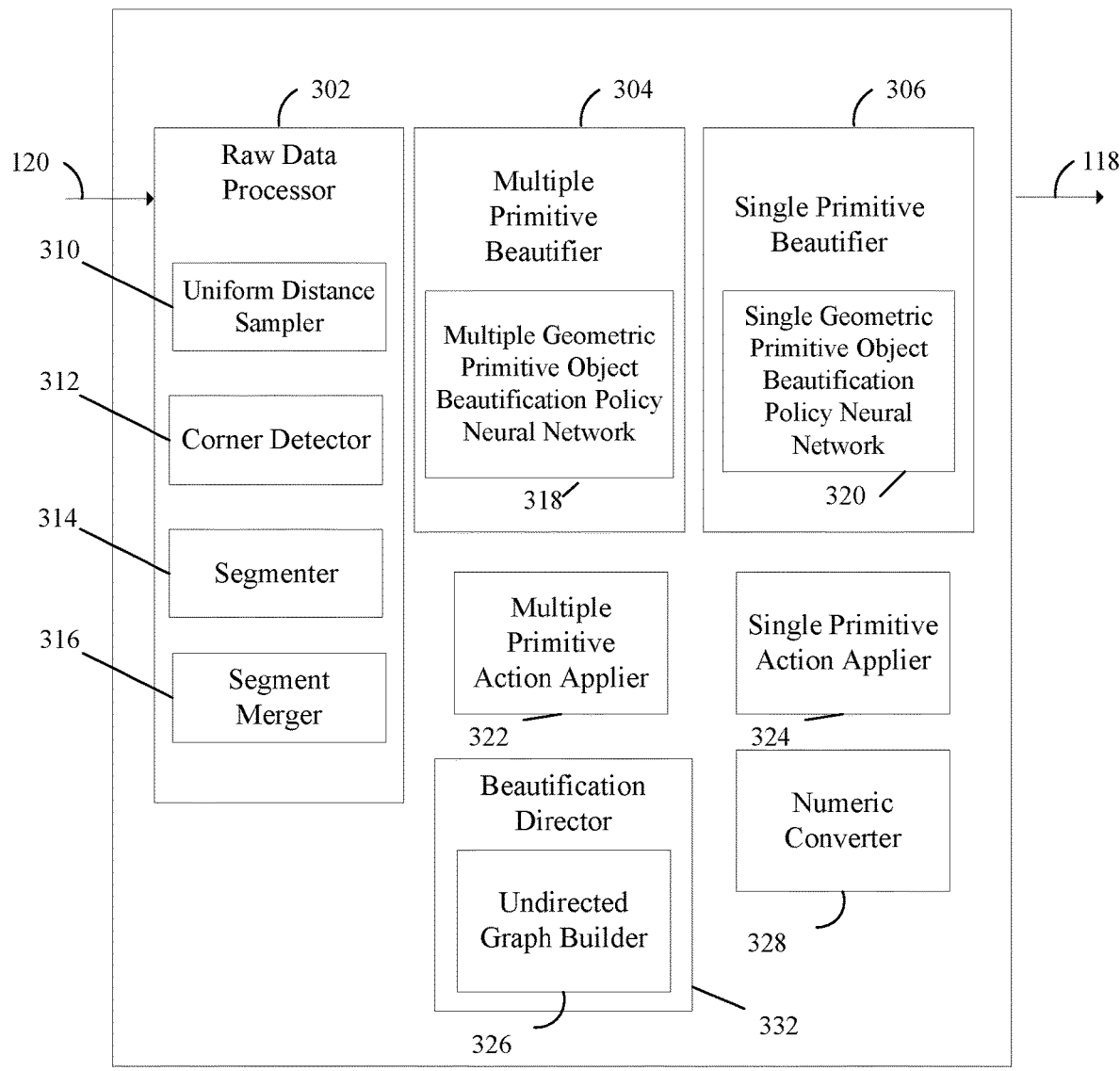
FIG. 3 shows a block diagram of a beautification engine in accordance with an example embodiment.

Flowchart 200 is described as follows with respect to FIG. 3. FIG. 3 is a block diagram of a beautification engine 300 in accordance with an embodiment. Beautification engine 300 of FIG. 3 may operate according to flowchart 200. Beautification engine 300 is an example embodiment of beautification engine 108 of FIGS. 1A and 1B, and may be located in computing device 122, drawing application 102, server 104, or elsewhere. As shown in FIG. 3, beautification engine 300 includes a raw data processor 302, a multiple primitive beautifier 304, a single primitive beautifier 306, a multiple primitive action applier 322, a single primitive action applier 324, a beautification director 332, and a numeric converter 328. Raw data processor 302 includes a uniform distance sampler 310, a corner detector 312, a segmenter 314, and a segment merger 316. Beautification director 3222 includes an undirected graph builder 326. Flowchart 200 and beautification engine 300 are described as follows.

Flowchart 200 begins with step 202. In step 202, a set of segments in raw drawing data is identified. For example, as shown in FIG. 3, raw data processor 302 receives raw drawing stroke data 120. Raw data processor 302 is configured to analyze raw drawing stroke data 120 to identify the drawing segments (e.g., lines) included therein. The identified segments correspond to basic geometric primitives that may be beautified as part of the global beautification process. Raw data processor 302 may identify the segments included in raw drawing stroke data 120 in any manner, conventional or proprietary, including by searching for sequences of adjacent points in raw drawing stroke data 120 that form straight or curved lines, and/or in any other manner. Raw data processor 302 is configured to generate a set of segments that includes the segments identified in raw drawing stroke data 120.

In step 204, a structural representation is constructed of the set of segments identified in the raw drawing data that specifies a topological relationship between the segments in the set of segments. Beautification director 332 is configured to generate a structural representation of the set of segments identified in raw drawing stroke data 120, in any manner, that maintains the topological relationship between the segments, including an identification of the segments, any connectivity between the segments, etc., which enables traversal of the segments. The structural representation may have any form, including a table, a graph, etc.

For instance, beautification director 332 may be configured to construct a structural representation that indicates, for each segment of the set of segments, any adjacent segments. A pair of segments may be considered to be adjacent if they intersect, in an embodiment. In another embodiment, a pair of segments may be considered to be adjacent if they contain points within a predetermined number of pixels from each other. This adjacency information preserves the global structure of the raw drawing data. Beautification director 332 may be configured to determine adjacent segments in any manner, including by determining proximate segments (e.g., by coordinates), determining segments that intersect, etc.

In an embodiment, beautification director 332 may include an undirected graph builder 326. Undirected graph builder 326 is configured to construct one or more undirected graphs based on the identified segments and their topological relationship. In an embodiment, undirected graph builder 326 is configured to assign a vertex to each segment of the set of segments generated by raw data processor 302. The vertexes are used to identify segments and their relative positions during the beautification process. An assigned vertex indication may have any suitable form, including a numerical value, an alphanumeric value, coordinates, etc. The undirected graph(s) are used to structure and order the beautification process. The undirected graph(s) may have any suitable form, including representing the vertexes (segments) as nodes, with edges connecting vertex pairs determined to correspond to adjacent segments.

In step 206, at least one set of adjacent segments is identified in the structural representation to which a multiple primitive beautification action applies. For instance, multiple primitive beautifier 304 may be configured to identify sets (e.g., pairs or other sized groups) of segments in the structural representation generated by beautification director 332 to which multiple beautification actions may be applied. A multiple beautification action is a beautification action that applies to multiple segments, such that the relationship between the multiple segments is changed by the multiple beautification action. The criteria for applying a beautification action are selectable and may depend upon the particular action. Further examples and description of multiple primitive beautifier 304 and identifying sets of segments to which multiple beautification actions may be applied are provided below.

For instance, in an embodiment, multiple primitive beautifier 304 may be configured to apply one or more multiple primitive beautification policies to identify vertex sets of adjacent segments in the undirected graph(s) to which multiple primitive beautification actions apply. Such policies may identify a vertex set for beautification based on proximity of segments in the set (e.g., being within a predetermined number of points/pixels of each other), the segments of the set having a predetermined geometric relationship with each other (e.g., first and second segments being substantially perpendicular, or substantially forming a predetermined angle, etc.), the segments of the set having particular portions proximate to each other (e.g., a first segment of the set having an end proximate to one or more other segments of the set), and/or fulfilling another policy.

In an embodiment, multiple primitive beautifier 304 may include a multiple geometric primitive object beautification policy neural network 318 configured to determine one or more particular types of beautification actions to apply. Further description of multiple geometric primitive object beautification policy neural network 318 is provided below.

In step 208, the multiple primitive beautification action is applied to the adjacent segments to generate multiple primitive beautified drawing data. For example, multiple primitive action applier 322 may be configured to apply multiple primitive beautification actions to the segments identified in step 206. Multiple primitive action applier 322 generates (or augments) beautified drawing stroke data 118 to include the segments as modified by the applied multiple primitive beautification actions. Any of one or more multiple primitive beautification actions may be performed based on the particular configuration of a segment set, including a snap line action, a perpendicular action, and/or other action involving multiple segments. Multiple primitive action applier 322 is configured to apply the multiple primitive beautification policy on each set of adjacent segments in the structural representation identified in step 206 in a sequential manner until all the applicable geometric primitives have been beautified with respect to each other.

Subsequent to completion of flowchart 200, beautification engine 300 generates beautified drawing stroke data 118 containing the beautified multiple primitives (and any beautified single primitives. Beautified drawing stroke data 118 is provided to the drawing application (e.g., drawing application 102) for display and optionally further interaction with by a user.

Figure 4:
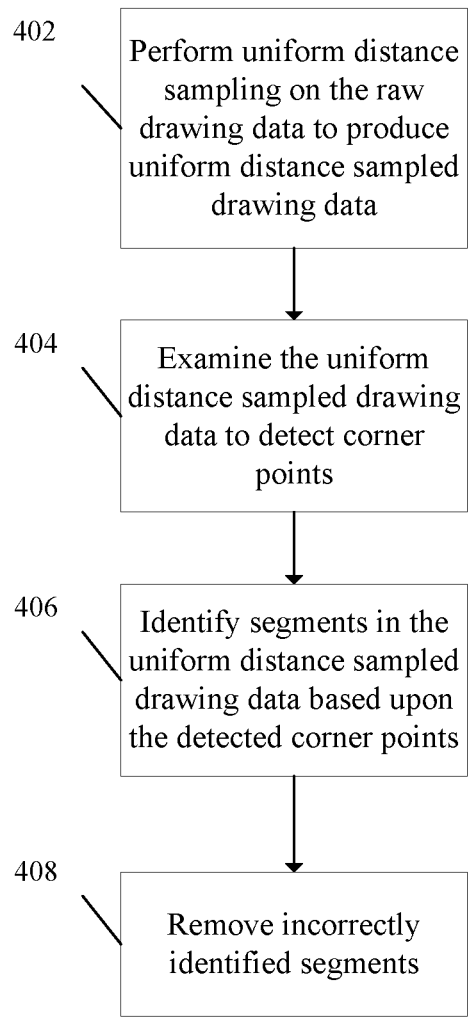
FIG. 4 shows a flowchart of a method of identifying segments in accordance with an example embodiment.

Further embodiments regarding flowchart 200 and beautification engine 300 are described as follows with respect to FIGS. 4-14B. For example, as described above, raw data processor 302 may be configured in various ways to identify segments in the raw drawing data. For instance, FIG. 4 shows a flowchart 400 of a method of identifying segments in accordance with an embodiment. Flowchart 400 may be performed by raw data processor 302 of beautification engine 108, and/or may be performed during step 202 of flowchart 200. Note that not all steps of flowchart 400 need be performed in all embodiments, and the steps of flowchart 400 may be performed in alternative orders. Flowchart 400 is described as follows with respect to beautification engine 300 of FIG. 3 for illustrative purposes.

Flowchart 400 begins in step 402. In step 402, uniform distance sampling is performed on the raw drawing data to produce uniform distance sampled drawing data. For instance, uniform distance sampler 310 may be configured to perform uniform distance sampling on raw drawing stroke data 120. For example, uniform distance sampler 310 may receive raw drawing stroke data 120. Raw drawing stroke data 120 may have any standard or proprietary format for drawing data (e.g., Drawing Interchange Format (DXF), DWG, Microsoft Visio® VSD, VDX, etc.). To generate uniform distance sampled drawing data, uniform distance sampler 310 may sample each drawing stroke in raw drawing stroke data 120 incrementally along the horizontal and vertical axis to produce a series of data points (such as sample points 814 shown in FIG. 8B and further described below) of substantially equal distance between adjacent data points in the sequence. Such uniform distance sampling removes small variations and simplifies the analysis and identification of the segments in the data. The sampling interval used by uniform distance sampler 310 may be selected in any manner, including as a matter of design choice, being sized to provide enough resolution to avoid missing a segment. Uniform distance sampler 310 generates uniform distance sampled drawing data based on the uniform distance sampling.

In step 404, the uniform distance sampled drawing data is examined to detect corner points. For instance, the uniform distance sampled drawing data may be processed by corner detector 312 of FIG. 3 to detect corner points. Corner detector 312 generates a plurality of corner points (e.g., as shown among sampled data points 816 of FIG. 8C and further described below). Corner detector 312 may implement one or more techniques and/or parameters for detecting corners, such by determining angles between sequences of adjacent sample points, etc., and comparing the determined angles against one or more predetermined angles indicative of corners. The corner points are identified to aid in the later identification of segments in the data with the corner points representing the ends of the segments.

In step 406, segments in the uniform distance sampled drawing data are identified based upon the detected corner points. For instance, segmenter 314 of FIG. 3 may be configured to analyze the uniform sampled drawing data and identified corner points (determined in steps 402 and 404) to identify segments that correspond to one or more basic geometric primitives that are indicative of a line. For instance, segmenter 314 may identify lines as continuous sequences of data points between identified corner points and/or end points of sequences that do not end at corners.

In step 406, incorrectly identified segments are removed. For instance, segment merger 316 of FIG. 3 may be configured to remove any incorrectly identified segments from the segments identified in the uniform distance sampled drawing data by segmenter 314. Examples of incorrectly identified segments may include multiple segments incorrectly identified as separate segments that are actually a single segment. Segment merger 316 may implement one or more techniques for detecting incorrectly identified segments, such by determining angles at identified corners between identified segments, and comparing the determined angles against one or more predetermined angles indicative of straight lines (e.g., angles very close to 180 degrees). In other embodiments, other techniques may be used to identify incorrectly identified segments. Segment merger 316 is configured to remove the incorrectly identified segments from the segments identified in the uniform distance sampled drawing data, which in some cases may be include combining two (or more) segments identified in the uniform distance sampled drawing data into a single segment.

In an embodiment, after segments have been identified in the raw drawing data according to flowchart 400, one or more undirected graphs may be constructed by undirected graph builder 326. The undirected graph(s) are used to direct the order of beautification of the segments in the raw drawing data. The undirected graph(s) include series of vertexes each of which represent a segment. The undirected graph(s) contain information concerning which vertexes represent segments that are adjacent to one another.

Figure 5:
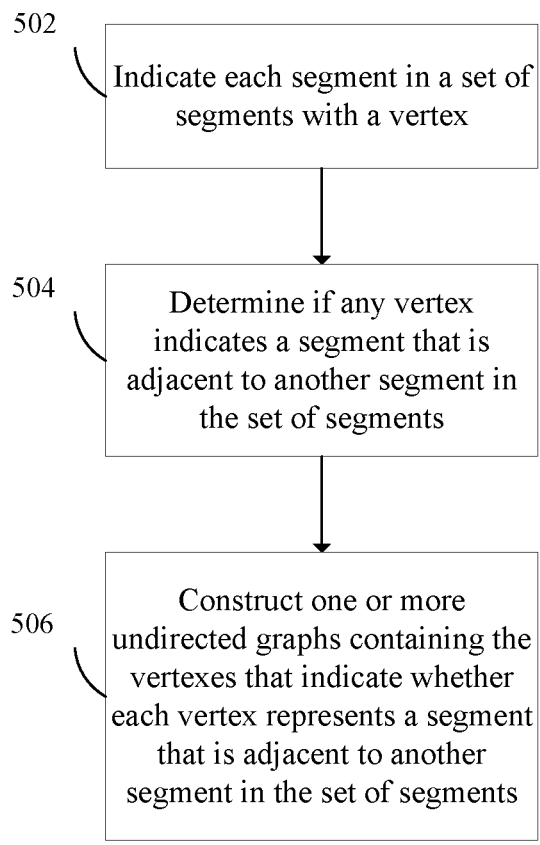
FIG. 5 shows a method of constructing an undirected graph in accordance with an example embodiment.

For instance, FIG. 5 shows a flowchart 500 of a method of constructing an undirected graph in accordance with an embodiment. In embodiments, flowchart 500 may be performed by undirected graph builder 326 in beautification director 332 shown in FIG. 3, and is an example of step 204 of flowchart 200 (FIG. 2). Flowchart 500 is described as follows.

Flowchart 500 begins in step 502. In step 502, each segment in the set of segments is indicated with a vertex. For instance, as described above with respect to step 204 (FIG. 2), undirected graph builder 326 may be configured to assign a vertex to each segment of the set of segments generated by raw data processor 302. The indicated vertexes are used to identify the segments and order the beautification of adjacent segments (as described in more detail below with regard to FIG. 7).

In step 504, it is determined if any vertex indicates a segment that is adjacent to another segment in the set of segments. For instance, undirected graph builder 326 may be configured to determine, for each vertex/segment of the set of segments, any other vertexes representing adjacent segments of the set. Undirected graph builder 326 may be configured to determine adjacent segments in any manner, including by determining proximate segments (e.g., by coordinates), determining segments that intersect, etc. A pair of segments may be considered to be adjacent if they intersect, in an embodiment. In another embodiment, a pair of segments may be considered to be adjacent if they contain points within a predetermined number of pixels from each other. This adjacency information preserves the global structure of the raw drawing data. For instance, to determine whether two segments are adjacent, a set of threshold parameters that establish adjacency may be first specified. In an embodiment, segments may be deemed adjacent if the sum of the distances from the segments to their intersection point divided between the minimum path distance between the segments is less than a specified separation threshold. An example separation threshold may be 0.45, although other threshold separation values may be chosen.

Figure 10:
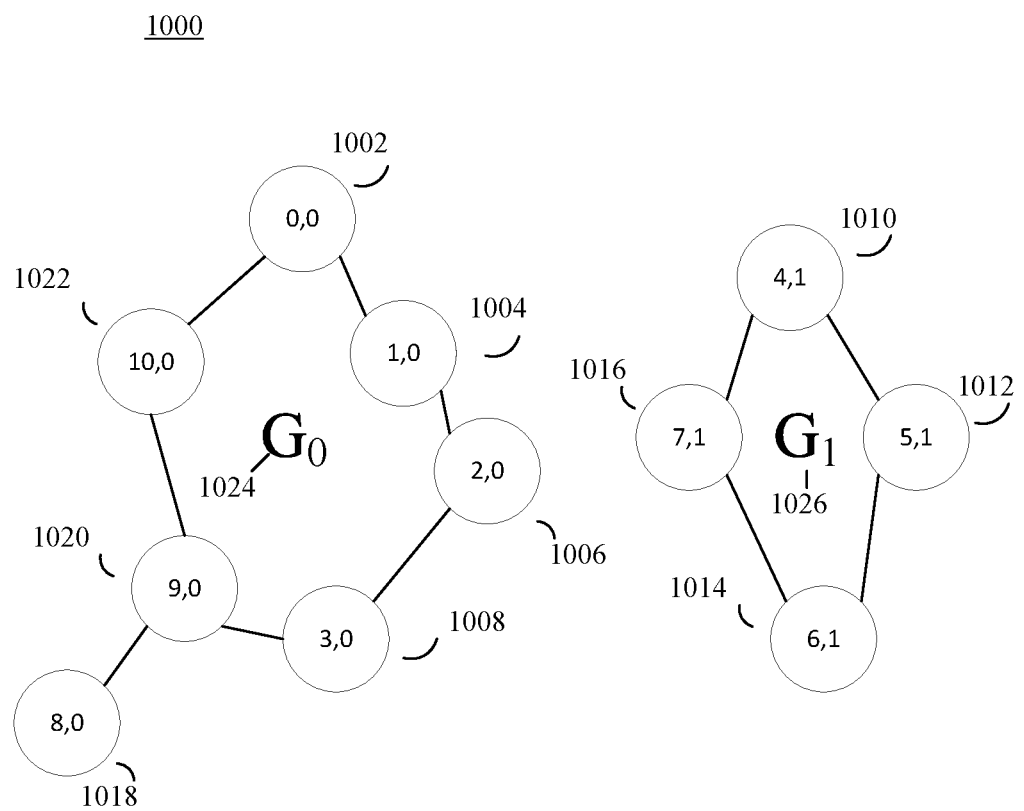
FIG. 10 shows an example of a set of undirected graphs constructed in accordance with an embodiment.
Figure 13:
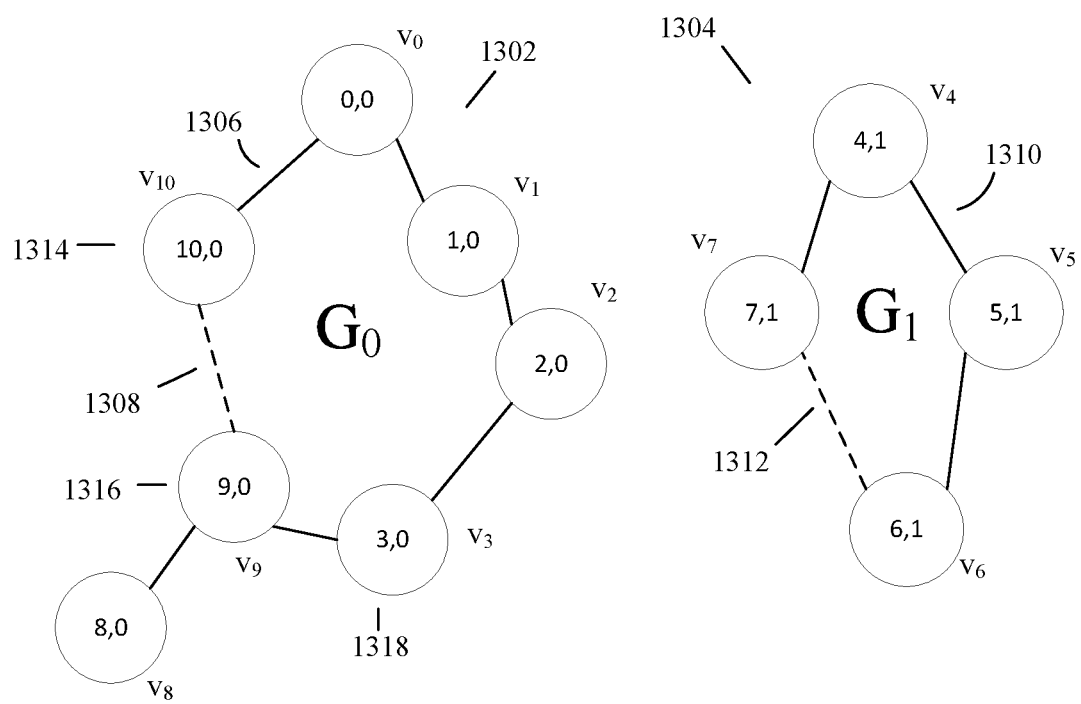
FIG. 13 shows a set of undirected graphs used to beautify raw drawing data in accordance with an embodiment.

In step 506, one or more undirected graphs containing the vertexes are constructed that indicate whether each vertex represents a segment that is adjacent to another segment in the set of segments. For instance, undirected graph builder 326 may be configured to construct undirected graph(s) based on the topological information relationship, including indicated segments (step 502) and determined adjacency information (step 504). The undirected graph may have any suitable form, including representing the vertexes (segments) as nodes, with edges connecting vertex pairs determined to correspond to adjacent segments. Examples of undirected graphs are shown in FIGS. 10 and 13 and described in additional detail below.

Figure 6:
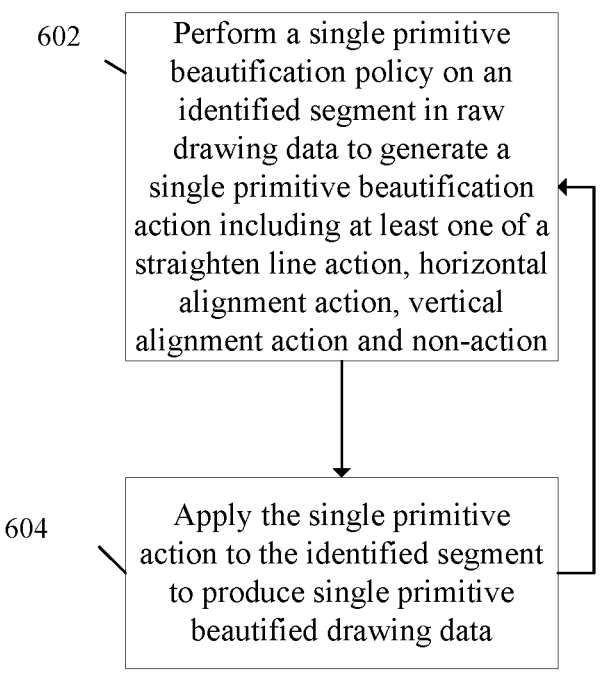
FIG. 6 shows a method of performing single primitive beautification in accordance with an example embodiment.

The generated undirected graph(s) may be used to order and structure the beautification of the raw drawing data. For instance, multiple primitive beautification may be performed on the drawing data, as described above with respect to steps 206 and 208 of flowchart 200. In another embodiment, in addition to or alternative to performing multiple primitive beautification, single primitive beautification may be performed. For example, FIG. 6 is a flowchart 600 of a method of performing single primitive beautification in accordance with an example embodiment. In embodiments, flowchart 600 may be performed by single primitive beautifier 306 shown in FIG. 3. Flowchart 600 is described as follows.

Flowchart 600 begins in step 602. In step 602, a single primitive beautification policy is performed on an identified segment to generate a single primitive beautification action. For example, single primitive beautifier 306 may be configured to identify single vertexes in the undirected graph(s) generated by undirected graph builder 326 to which single beautification actions may be applied. A single beautification action is a beautification action that applies to one segment, such that the single segment is changed by the single beautification action without changing other segments. The criteria for applying a single beautification action are selectable and may depend upon the particular action.

For instance, in an embodiment, single primitive beautifier 306 includes a single geometric primitive object beautification policy neural network 320 that determines beautification actions for single segments based upon user feedback. Single primitive beautifier 306 may access numeric converter 328 to convert an identified segment into numeric features to aid in the beautification process of the identified segment.

In step 604, the single primitive beautification action is applied to the identified segment to produce single primitive beautified drawing data. For instance, single primitive action applier 324 may be configured to apply single primitive beautification actions to the segments identified by single primitive beautifier 306. Examples of single primitive beautification actions that single primitive action applier 324 may perform include a straighten line action, a horizontal alignment action, and a vertical alignment action or non-action. Single primitive beautification actions are described in more detail with respect to FIGS. 11A-11C.

Single primitive beautification and multiple primitive beautification may be performed on all the segments that can be identified in the raw drawing data as being suitable for such beautification. In an embodiment, if multiple segments are part of an object or shape such as a square, these beautification techniques may be performed sequentially around the shape to beautifying each pair of adjacent segments (and optionally larger groups of segments) with respect to each other.

Figure 7:
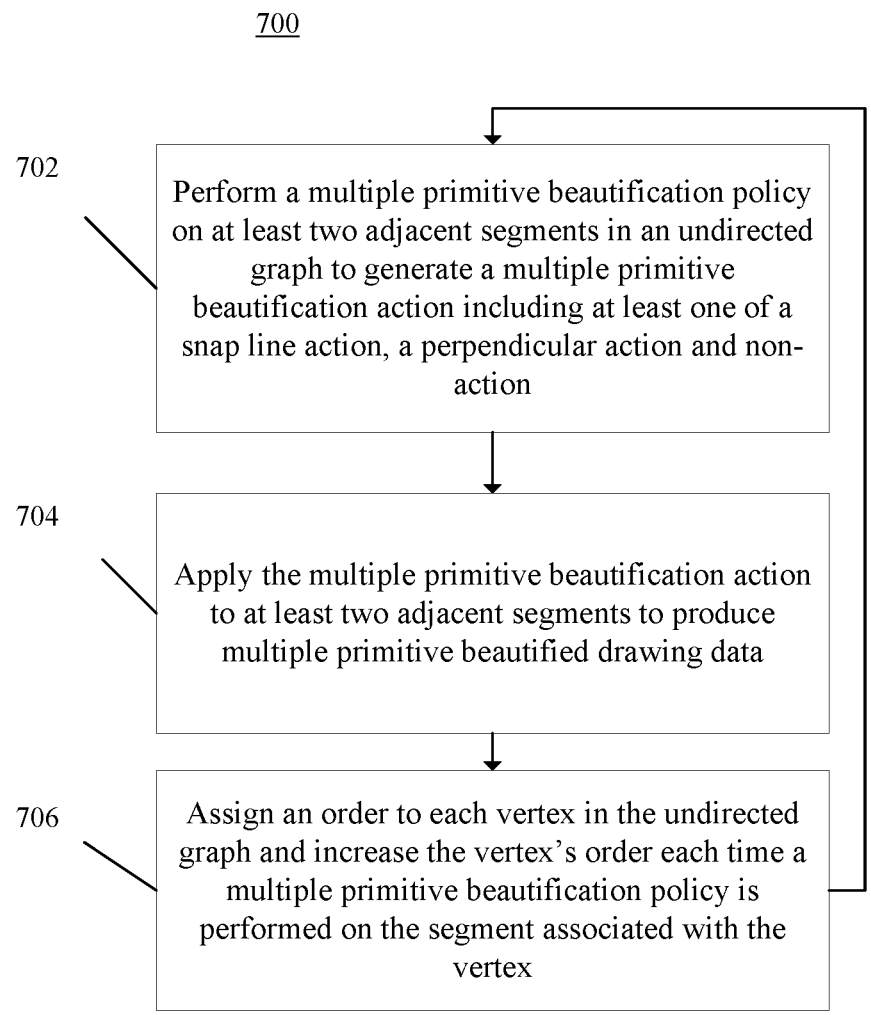
FIG. 7 shows a method of performing multiple primitive beautification in accordance with an example embodiment.

For instance, FIG. 7 shows a flowchart 700 of a method of performing multiple primitive beautification in accordance with an embodiment. In embodiments, flowchart 700 may be performed by multiple primitive beautifier 304 and multiple primitive action applier 322 shown in FIG. 3. Flowchart 700 is described as follows.

Flowchart 700 begins in step 702. In step 702, a multiple primitive beautification policy is performed on at least two adjacent segments in an undirected graph to generate a multiple primitive beautification action that includes at least one of a snap line action, perpendicular action and non-action. For example, multiple primitive beautifier 304 may be configured to perform a multiple primitive beautification policy on a pair of adjacent segments in the undirected graph. Multiple primitive beautification policies and actions are described in more detail with respect to FIGS. 12A-12C. A multiple primitive beautification policy specifies one or more parameters and/or conditions to be met before it is determined that a multiple primitive beautification action is needed. For instance, in an example snap line policy, the proximity of two segments may be examined to determine if a snap line action is appropriate. Any number of multiple primitive beautification policies may exist and be applied, including a perpendicularize policy, etc.

In step 704, the multiple primitive beautification action is applied to at least two adjacent segments to produce multiple primitive beautified drawing data. For instance, multiple primitive action applier 322 may be configured to apply multiple primitive beautification actions to the segments of the sets of vertexes identified in step 702, in a similar manner as described above with respect to step 208 (FIG. 2). For example, if multiple primitive beautifier 304 determined that a snap-line action is appropriate for a segment pair, one or both segments of the pair may be moved so that the segments contact each other (e.g., an end of a first segment contacts a side of a second segment).

In step 706, an order is assigned to each vertex in the undirected graph and the vertex's order is increased each time a multiple primitive beautification policy is performed on the segment associated with the vertex. For instance, undirected graph builder 326 may be configured to assign orders to vertexes and to increase a vertex's order each time a multiple primitive beautification policy is performed on the segment of that vertex. The order is used in the beautification process to determine how much to alter a particular segment during the application of a beautification action. Vertexes with a higher order will tend to have been previously beautified more than vertexes with a lower order. Thus, when applying the beautification action, vertexes with a higher order may be moved less to prevent unduly altering previously beautified vertexes. The beautification process of steps 702, 704 and 706 may be repeated until all the vertexes in the undirected graph(s) have been beautified with respect to each other, thus globally beautifying the input drawing data.

As described above, the raw input drawing data (e.g., raw drawing stroke data 110) may be subjected to processing by raw data processor 302 (FIG. 3) to decompose the input strokes into low-level geometric primitives such as segments. An exemplary process consists of five sequential steps, namely, receiving input strokes, performing uniform distance sampling (e.g., step 402 of FIG. 4), finding corner points (e.g., step 404 of FIG. 4), segmentation (e.g., step 406 of FIG. 4), and merging (e.g., step 408 of FIG. 4). Raw data processor 302 generates a set of basic geometric primitives based on the processing. Basic geometric primitives (e.g., lines/segments, squares, rectangles, triangles, other polygons, etc.) are identified in raw input drawing data so that the identified segments may be subjected to beautification actions that are used to alter the raw input drawing data to more closely conform to the basic geometric primitives that a user was trying to create. FIGS. 8A-8E show drawing screens with examples of segment identification performed according to flowchart 400 (FIG. 4) in accordance with embodiments.

In FIG. 8A, a drawing screen 802 illustrates input raw drawing strokes 812 that may be represented in raw drawing stroke data 120 (e.g., in the form of data points, vectors, etc.). In the example shown, raw drawing strokes 812 consist of solid lines that may or may not be connected. The lines may be straight or curved. The input drawing strokes data representative of raw drawing strokes 812 may be received from a remote source (e.g., drawing application 102) so that the code and processing power needed to quickly implement the segment identification process may be in the cloud. However, in another embodiment, the code processing power needed for the segment identification process may be provided locally in a single device (e.g., computing device 122). The reception of the data representative of raw drawing strokes 812 may be implemented, for example, by raw data processor 302 of FIG. 3.

In FIG. 8B, a drawing screen 804 illustrates the performing of uniform distance sampling on raw drawing strokes 812 as part of the segment identification process (step 402 of FIG. 4). The raw drawing strokes 812 are sampled such that all sampled points 814 share a similar distance along an axis between them. The result is series of sampled points 814 in the outline of raw drawing strokes 812. Uniform distance sampling 804 is performed on raw drawing strokes 812 to remove small variations that are unimportant to the analysis and to limit the processing power required to analyze input raw drawing strokes 812. Uniform distance sampler 310 of FIG. 3 can, for example, be used to perform the uniform distance sampling of FIG. 8B.

In FIG. 8C, a drawing screen 804 illustrates the find corner points process of the segment identification process (step 404 of FIG. 4). Corner point detection allows the starting and ending points of the basic geometric primitive segments to be identified. Corner points 816 in uniformly sampled data points 814 may be identified by examining the angles between adjacent points data points. Corner detector 312 of FIG. 3 can, for example, be used to identify corner points 816 shown in FIG. 8C.

In FIG. 8D, a drawing screen 804 illustrates a segmentation portion of the segment identification process (step 406 of FIG. 4). The segmentation process decomposes sampled data points 814 into a sequence of basic geometric primitives or segments 818 based on separation indicated by detected corner points 816. Segmentation allows segments 818 that may be subjected to beautification actions to be identified. Segmenter 314 of FIG. 3 can, for example, be used to identify segments 818 shown in FIG. 8D.

In FIG. 8E, a drawing screen 810 illustrates a merge process of the segment identification process (step 408 of FIG. 4). The merge process is applied to correct for any false identifications of segments during segmentation. For example, a single segment 820 may have been falsely identified as two separate segments 822 and 824 (in FIG. 8D). Minimizing the false identification of segments improves the result of the beautification actions that are later applied to the identified segments. The segment merger 316 of FIG. 3 can, for example, be used to merge first and second segments 822 and 824 into a single segment 820 shown in FIG. 8E.

Figure 9:
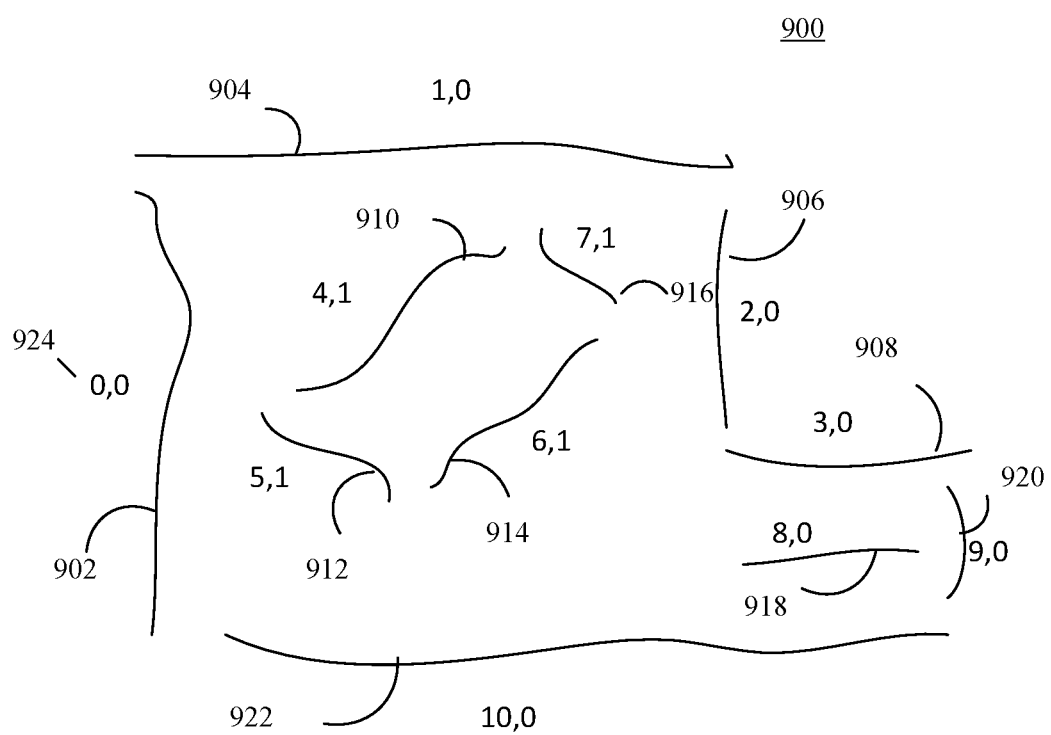
FIG. 9 shows a drawing screen with segments and vertexes indicated in accordance with an example embodiment.

As described above, segments identified in the raw drawing data may be represented as vertexes to assist in structuring the order and manner of the beautification process. For instance, FIG. 9 shows a drawing screen 900 with segments and vertexes indicated in accordance with an example embodiment. In FIG. 9, each identified segment in the raw drawing data is denoted as a vertex. The vertex identifies the segment number and a number that represent which other segments are adjacent to the segment. Thus, in FIG. 9, segment 902 is identified by vertex (0,0) 924 with the first zero indicating that it is the first vertex identified and the second number indicating that the vertex is connected to segments in group zero, the first group of adjacent segments identified. In FIG. 9, segments 902, 904, 906, 908, 918, 920 and 922 are identified as being part of group zero while segments 910, 912, 914 and 916 are identified as being part of group one based upon the adjacency of the segments represented by the vertexes. Representing the segments identified in the raw drawing data as vertexes is useful in structuring the global beautification of the input drawing data as described in more detail herein. As an example, the undirected graph builder 326 of FIG. 3 may be used to create the representation of the segments as vertexes shown in FIG. 9.

FIG. 10 is an example of an undirected graph set 1000 constructed in accordance with an embodiment. In FIG. 10, the segments identified in FIG. 9 are represented by undirected graph set 1000 as a set of two undirected graphs $G_0$ 1024 and $G_1$ 1026. As an example, undirected graph builder 326 of FIG. 3 may be used to create undirected graphs $G_0$ 1024 and $G_1$ 1026. Constructing such a graphic representation aims at (i) preserving global information among various local segments such as low-level geometric primitives; and (ii) assisting in determining the applied beautification action manner and/or order. Multiple stages may be followed to constructing an undirected graph. First a segment distance matrix is calculated to determine which segments are adjacent and then an undirected graph set G is grown. Segment distance is used for determining whether two segments are adjacent or not. In an embodiment, the summation of the distances to the segments intersection point is calculated and then the summation is divided by the minimum path distance between the pair of segments. Two vertexes or segments are considered adjacent if and only if the calculated result is no larger than a prescribed/predetermined threshold. The threshold is variable and depends upon the particular application and user preferences. In an embodiment, the prescribed threshold is set as 0.45. However, those skilled in the art will appreciate that different values may be used depending upon the circumstances.

Once the adjacent segments have been identified, one or more undirected graphs are constructed that represent the segments as vertexes connected to other vertexes that represent adjacent segments. The segments of FIG. 9 are represented by undirected graphs $G_0$ 1024 and $G_1$ 1026 in FIG. 10. In undirected graph $G_0$ 1024, vertex 1002 is connected to vertexes 1022 and 1004 because the segments represented by vertexes 1022 and 1004 are adjacent to the segments represented by vertex 1002. The adjacency information leads to vertexes 1002, 1004, 1006, 1008, 1018, 1020 and 1022 being identified as belonging to undirected graph $G_0$ 1024 while vertexes 1010, 1012, 1014 and 1016 are indicated as belonging to undirected graph $G_1$ 1026.

Figures 11A, 11B, 11C:
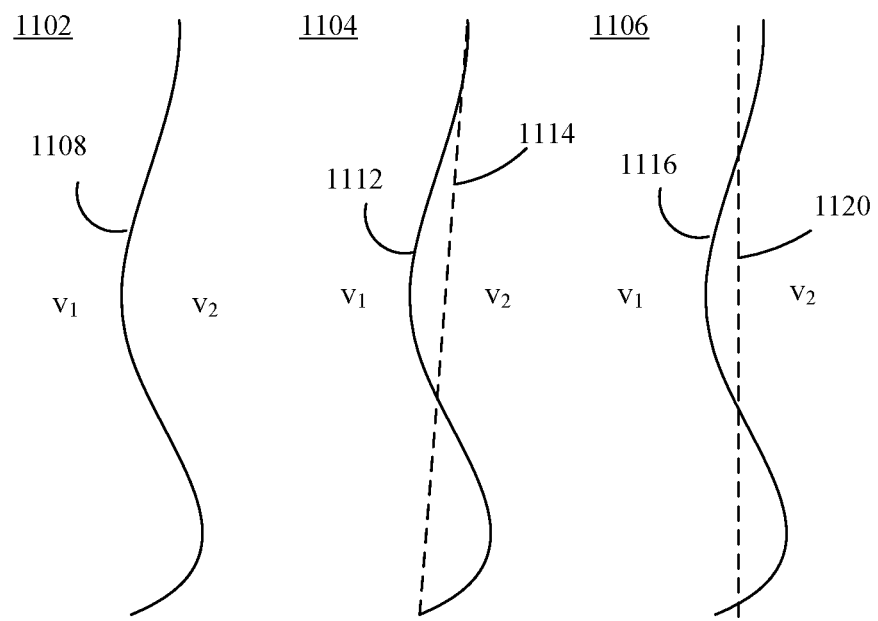
FIGS. 11A-11C show drawing screens with examples of single primitive beautification actions in accordance with embodiments.

FIGS. 11A-11C show drawing screens with examples of single primitive beautification actions in accordance with embodiments. The three single geometric 403270-US-NP primitive beautification actions shown are: (i) a non-action is performed on drawing screen 1102 in FIG. 11A; (ii) a straighten line action is performed on drawing screen 1104 in FIG. 11B; and (iii) a horizontal and vertical action is performed on drawing screen 1106 in FIG. 11C. The single primitive beautification actions of FIGS. 11A-11C can, for example, be performed by the single primitive beautifier 306 and single primitive action applier 324 of FIG. 3 in flowchart 600 (FIG. 6). In an embodiment, the decision to perform the actions may be made by the single geometric primitive object beautification policy neural network 320 of FIG. 3.

As shown in FIG. 11A, a non-action involves leaving beautified drawing stroke 1108 unchanged, in the same position and form as the original drawing stroke. The non-action is important in that the input drawing strokes may not require beautification. The determination to not perform a single primitive beautification action may be based on a number of factors such as the prior performance or rejection of a beautification action on the segment or the failure to satisfy a set of specified criteria for an affirmative action.

As shown in FIG. 11B, a straighten line action 1104 involves replacing a curved raw drawing stroke 1112 with a straightened drawing stroke 1114. The determination to perform a straighten line action may be based on a number of factors such as the degree of curve detected in raw drawing stroke 1112, the prior performance or rejection of a beautification action with regard to stroke 1112 or the satisfaction of a set of beautification criteria established with respect to the straighten line action.

As shown in FIG. 11C, a horizontal and vertical action involves replacing curved raw drawing stroke 1116 with a straightened drawing stroke 1120 that is also aligned to the horizontal or vertical axis. The determination to perform a horizontal and vertical action is based on a number of factors such as the degree of curve detected in raw drawing stroke 1116, the prior performance or rejection of a beautification action with regard to stroke 1116 or the satisfaction of a set of beautification criteria established with respect to the horizontal and vertical action.

While the above examples of single geometric primitive beautification actions are described, those skilled in the art will appreciate that additional single primitive beautification actions may be incorporated into various embodiments.

Figures 12A, 12B, 12C:
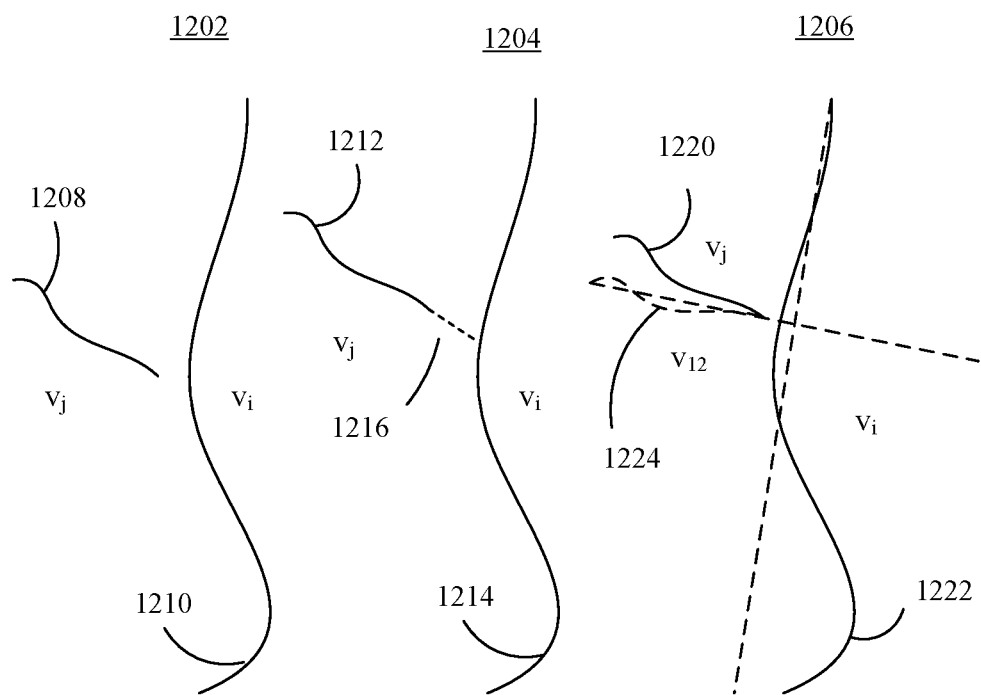
FIGS. 12A-12C show drawing screens with examples of multiple primitive beautification actions in accordance with embodiments.

FIGS. 12A-12C show drawing screens with examples of multiple primitive beautification actions in accordance with embodiments. The three multiple geometric primitive beautification actions shown are: (i) a non-action performed on drawing screen 1202 in FIG. 12A; (ii) a snap line action performed on drawing screen 1204 in FIG. 12B; and (iii) a perpendicular action performed on drawing screen 1206 in FIG. 12C. The multiple primitive beautification actions of FIGS. 12A-12C can, for example, be performed by multiple primitive beautifier 304 and multiple primitive action applier 322 of FIG. 3 in steps 702 and 704 (FIG. 4). In an embodiment, the decision to perform the actions may be made by multiple geometric primitive object beautification policy neural network 318 of FIG. 3.

As shown in FIG. 12A, a non-action involves leaving first and second raw drawing strokes 1208 and 1210 in the same position and form as they originally were. The non-action is important in that raw drawing strokes 1208 and 1210 may not require beautification with respect to each other or have been previously beautified with respect to each other. The determination to not perform a multiple primitive beautification action may be based on a number of factors such as the prior performance or rejection of a beautification action or the failure to satisfy a set of beautification criteria.

As shown in FIG. 12B, a snap line action involves moving/shifting or extending first original raw drawing stroke 1212 a distance 1216 required to bring first drawing stroke 1212 into contact with second drawing stroke 1214. The determination to perform a snap line action is based on a number of factors such as the proximity of drawing stroke 1212 to drawing stroke 1214, the prior performance or rejection of a beautification action with regard to strokes 1212 or 1214, or the satisfaction of a set of beautification criteria established with respect to the snap line action.

As shown in FIG. 12C, a perpendicular action involves reorienting or moving first raw drawing stroke 1220 to a new position 1224 so that first drawing stroke 1220 is perpendicular to second drawing stroke 1222. The determination to perform a perpendicular action is based on a number of factors such as the angle detected between raw drawing stroke 1220 and raw drawing stroke 1222, the prior performance or rejection of a beautification action with regard to stroke 1220 or 1222, or the satisfaction of a set of beautification criteria established with respect to the perpendicular action.

While the above specific examples of multiple geometric primitive beautification actions are described, those skilled in the art will appreciate that additional multiple primitive beautification actions may be incorporated into other embodiments.

As described above with respect to FIG. 7, drawing data may be beautified with respect to multiple primitives, including two segments at a time. For instance, FIG. 13 shows an undirected graph set 1300 used to beautify raw drawing data in accordance with an embodiment. In the example of FIG. 13, undirected graph set 1300 includes first and second undirected graphs 1302 and 1304 (based on undirected graphs $G_0$ 1024 and $G_1$ 1026 of FIG. 10). Two geometric primitive beautification is performed on each vertex in first and second undirected graphs 1302 and 1304 along each pair of adjacent vertexes. As each vertex and its adjacent vertexes are examined, the current vertex and its adjacent vertexes are assigned two orders respectively. The orders assigned to input vertexes may be used to determine the manner that beautification actions are applied. For instance, for each vertex and an adjacent vertex, there may be three cases: (i) the vertex and the adjacent vertex have been beautified with respect to each other; (ii) the adjacent vertex has not been beautified with respect to other vertexes; and (iii) the adjacent vertex has been beautified with respect to the other vertexes. As described as follows, these cases may be used to determine how beautification is applied.

For the first case, because the vertexes have been beautified with respect to each other, no beautification action is performed on the vertexes to avoid duplicate beautifications. For the second and third cases, a beautification action may be applied. The beautification action to apply may be predicted by a two-geometric primitive object beautification policy neural network (e.g., multiple geometric primitive object beautification policy neural network 318) that has been trained using hand-drawn sketches as raw data and/or in another manner. For case (ii), because the adjacent vertex has not been beautified with respect to other vertexes, a higher order is assigned to the current vertex than the adjacent vertex and the selected beautification action is applied taking this order information into account. For example, the current vertex may be assigned an order of 2 and its adjacent vertex an order of 1. As a result, a vertex with higher order implies that this vertex has already been beautified with respect to other vertexes, and some other vertexes are dependent on it for their beautified relationship. Vertexes with a higher order undergo less shape change or position change during the beautification process. Otherwise, beautification of one vertex may have a great impact on other vertexes which are dependent on the vertex for their previous beautification.

For case (iii), because the adjacent vertex has been beautified with respect to other vertexes before, the same order is assigned to the current vertex and the adjacent vertex and the beautification action is applied in a way that causes less shape and position change for both vertexes to which the beautification action is being applied.

In FIG. 13, the solid lines 1306 and 1310 correspond to case (ii) where the vertex has not been beautified with respect to an adjacent vertex while dashed lines 1308 and 1312 correspond to case (iii) where the vertexes have already been beautified with respect to another vertex. As a result of the undirected graph, when performing the beautification between vertex $v_9$ 1316 and $v_3$ 1318, the beautification action would be less likely to move vertex $v_9$ 1316 than vertex $v_3$ 1318 because vertex $v_9$ 1316 has already been beautified with respect to vertex $v_{10}$ 1314.

In the drawing beautification process, first and second policy neural networks may be used for predicting the desired beautification actions. For instance, single geometric primitive object beautification policy neural network 320 may be used for predicting single geometric primitive beautification actions and multiple geometric primitive object beautification policy neural network 318 may be used for predicting two (or more) geometric primitive beautification actions. Because first and second policy neural networks are used in the drawing beautification process, deep reinforcement learning may be used to continuously keep training the policy neural networks. Customers' feedback may be used as the reward for the neural networks and currently trained policy neural networks may be regarded as pre-trained networks for reinforcement learning and penalty values assigned to beautification actions that are rejected by the user.

Figure 14A:
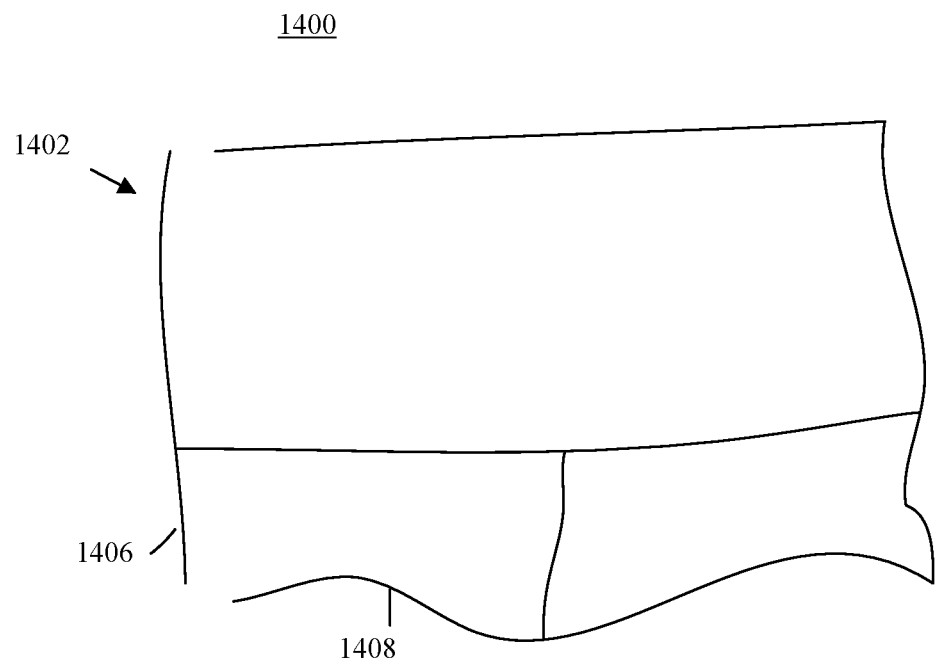
FIG. 14A shows an example drawing screen showing raw drawing strokes in accordance with an embodiment.
Figure 14B:
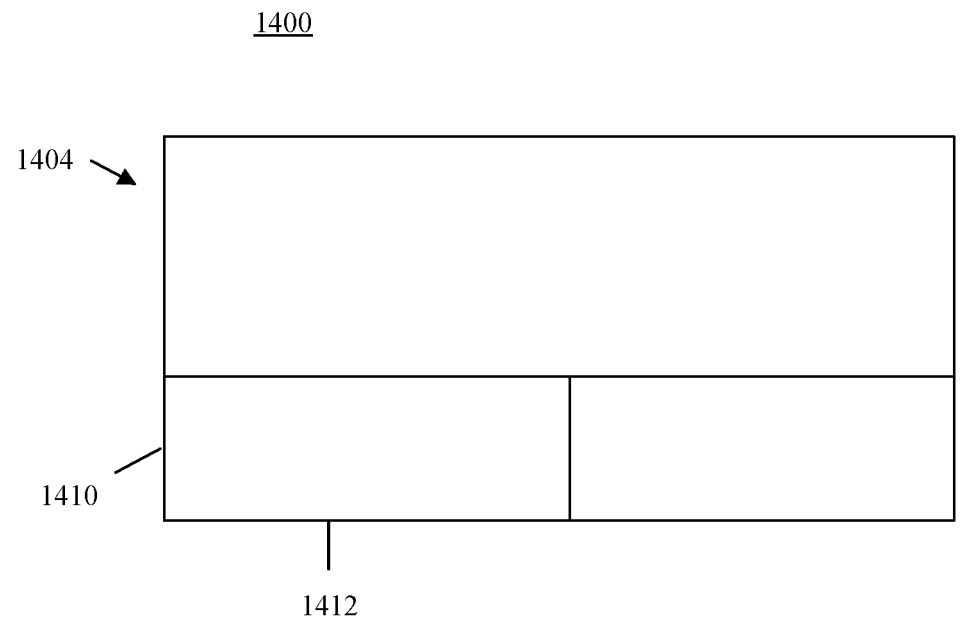
FIG. 14B shows an example drawing screen showing beautified drawing strokes in accordance with an embodiment.

Accordingly, in embodiments, raw drawing data representative of drawings made by users may be automatically beautified. For instance, FIGS. 14A and 14B show an example drawing screen 1400 showing raw drawing strokes 1402 and beautified drawing strokes 1404, respectively, in accordance with embodiments. Beautified drawing strokes 1404 may be generated from raw drawing strokes 1402 by beautification engine 108 of FIG. 1, in embodiments. Raw drawing strokes 1402 represent raw drawing stroke data received on an electronic canvas (e.g., canvas 106 of FIGS. 1A and 1B). First and second raw drawings strokes 1406 and 1408 in raw drawing strokes 1402 are curved, detached from one another, not aligned to the horizontal and vertical axis and not perpendicular with respect to one another. However, in beautified drawing strokes 1404 (which may also be displayed on canvas 106 and/or other display screen), first and second geometric primitives 1406 and 1408 have been improved or beautified in a number of respects. First, individual lines 1406 and 1408 have been subjected to single primitive beautification actions to be straightened and brought into horizontal and vertical alignment. Second, individual lines 1406 and 1408 have been determined to be adjacent and are subjected to multiple primitive beautification actions whereby they are snapped together and made perpendicular. By performing similar beautification actions on the other segments of raw drawing strokes 1402, globally beautified drawing strokes 1404 are produced from raw drawing strokes 1402.

Example Computer System Implementation

Drawing application 102, server 104, beautification engine 108, computing device 122, beautification engine 300, raw data processor 302, multiple primitive beautifier 304, single primitive beautifier 306, uniform distance sampler 310, corner detector 312, segmenter 314, segment merger 316, multiple primitive action applier 322, single primitive action applier 324, undirected graph builder 326, numeric converter 328, beautification director 332, flowchart 200, flowchart 400, flowchart 500, flowchart 600, and/or flowchart 700 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 15:
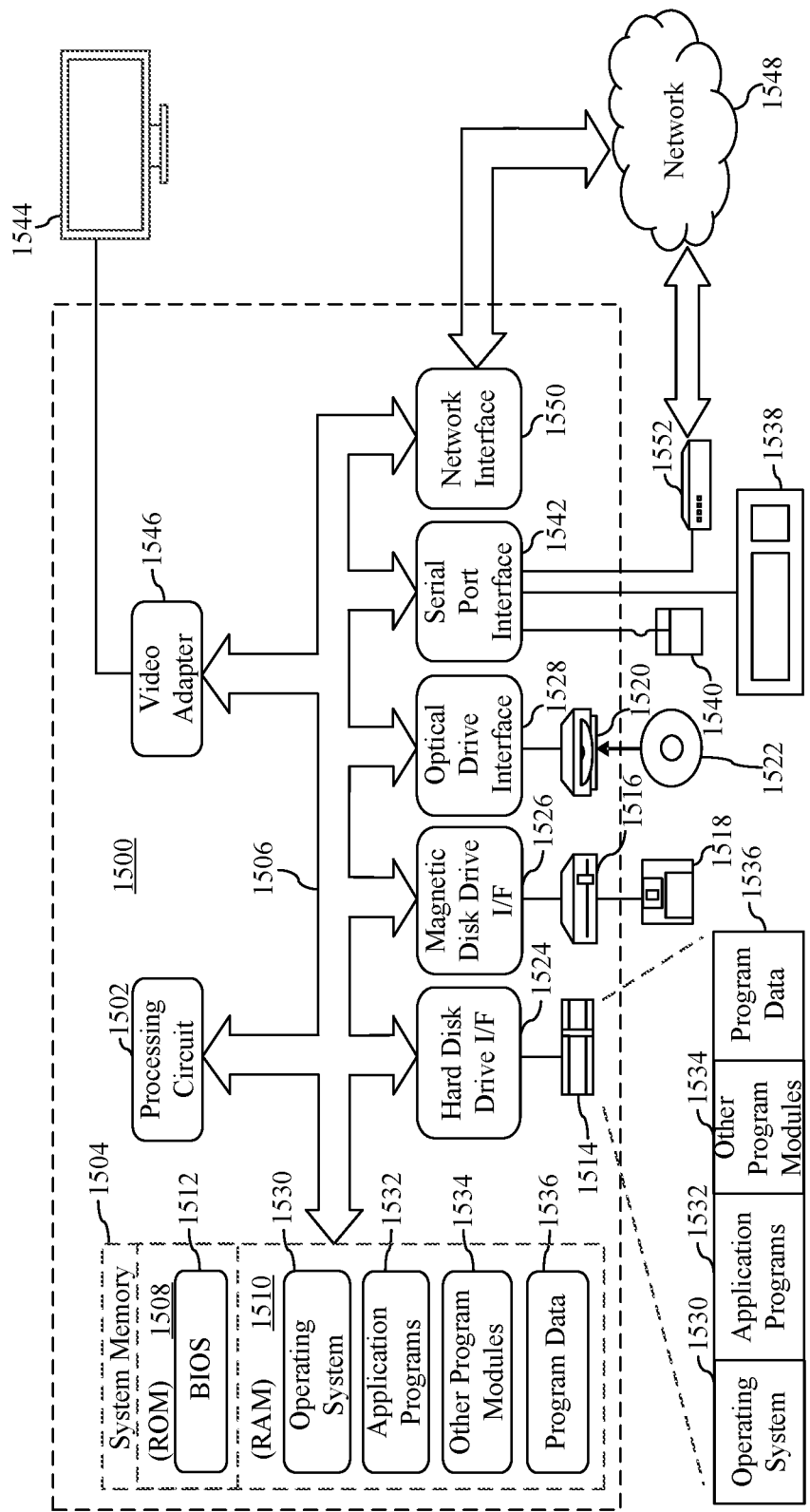
FIG. 15 shows an example of a system for implementing an embodiment.

FIG. 15 depicts an exemplary implementation of a computing device 1500 in which embodiments may be implemented. For example, computing device 122, server 104, and/or any or all the steps of any or all the flowcharts depicted in FIGS. 2 and 4-7 may each be implemented in one or more computing devices similar to computing device 1500 in stationary or mobile computer embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

FIG. 15 depicts an example processor-based computer system 1500 that may be used to implement various embodiments described herein. For example, system 1500 may be used to implement any of the components of the beautification engine as described above in reference to FIG. 3.

System 1500 may also be used to implement computing device 122, server 104, and/or any or all the steps of any or all the flowcharts depicted in FIGS. 2 and 4-7. The description of system 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules or components may be stored on the hard disk, magnetic disk, optical disk, ROM, or RAM. These program modules include an operating system 1530, one or more application programs 1532, other program modules 1534, and program data 1536. In accordance with various embodiments, the program modules may include computer program logic that is executable by processing unit 1502 to perform any or all the functions and features of drawing application 102, beautification engine 108, beautification engine 300, raw data processor 302, multiple primitive beautifier 304, single primitive beautifier 306, uniform distance sampler 310, corner detector 312, segmenter 314, segment merger 316, multiple primitive action applier 322, single primitive action applier 324, undirected graph builder 326, numeric converter 328, beautification director 332, flowchart 200, flowchart 400, flowchart 500, flowchart 600, and/or flowchart 700 (including any step of flowcharts 200, 400, 500, 600, and/or 700).

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers. Display screen 1544, and/or any other peripheral output devices (not shown) may be used for display 130, display 330, and/or any further embodiments described herein.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments described herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Additional Exemplary Embodiments

In an embodiment, a computing device includes a drawing beautification engine configured to beautify raw drawing data. The drawing beautification engine includes a raw data processor configured to receive the raw drawing data and identify a set of segments in the raw drawing data. A beautification director constructs a structural representation of the set of segments identified in the raw drawing data that specifies a topological relationship between the segments in the set of segments. A multiple primitive beautifier identifies at least one set of adjacent segments in the structural representation to which a multiple primitive beautification action applies. A multiple primitive action applier applies the multiple primitive beautification action to the adjacent segments to generate beautified raw drawing data.

In an embodiment, the beautification director comprises an undirected graph builder and the structural representation comprises one or more undirected graphs constructed from the set of segments that indicates each segment in the set as a vertex, and indicates for each vertex any other vertexes representing adjacent segments in the set.

In an embodiment, the multiple primitive beautifier is configured to apply at least one multiple primitive beautification policy to identify the at least one set of adjacent segments in the structural representation to which the multiple primitive beautification action applies.

In an embodiment, the multiple primitive beautifier is configured to apply the multiple primitive beautification policy on each vertex and any adjacent vertexes in the one or more undirected graphs.

In an embodiment, the drawing beautification engine includes a single primitive beautifier configured to identify at least one segment in the structural representation to which a single primitive beautification action applies. A single primitive action applier applies the single primitive beautification action to the at least one identified segment to further generate the beautified raw drawing data.

In an embodiment, the single primitive beautification action comprises at least one of a straighten line action, a horizontal alignment action or a vertical alignment action.

In an embodiment, the single primitive beautifier includes a numeric converter configured to convert the identified segment into numeric features.

In an embodiment, the multiple primitive beautification action comprises at least one of a snap line action or a perpendicular action.

In an embodiment, the multiple primitive beautifier comprises a multiple object beautification policy neural network.

In an embodiment, the raw data processor includes a sampler configured to perform uniform distance sampling on the raw drawing data and produce uniform distance sampled drawing data, a corner detector configured to examine the uniform distance sampled drawing data and detect corner points, a segmenter configured to identify segments in the uniform distance sampled drawing data based upon the detected corner points, and a segment merger configured to remove any incorrectly identified segments.

In an embodiment, a method includes identifying a set of segments in raw drawing data. A structural representation of the set of segments identified in the raw drawing data is created that specifies a topological relationship between the segments in the set of segments. At least one set of adjacent segments is identified in the structural representation to which a multiple primitive beautification action applies. The multiple primitive beautification action is applied to the adjacent segments to generate multiple primitive beautified drawing data.

In an embodiment, constructing a structural representation of the set of segments identified in the raw drawing data that specifies a topological relationship between the segments in the set of segments further includes indicating each segment in the set of segments with a vertex. For each vertex, any other vertexes representing segments adjacent to the vertex in the set are indicated. At least one undirected graph containing the vertexes is constructed that indicates for each vertex any other vertexes representing adjacent segments in the set.

In an embodiment, an order is assigned to the vertexes of the at least one undirected graph. At least one multiple primitive beautification policy is applied to the vertexes in the at least one undirected graph based on the assigned order to identify the at least one set of adjacent segments in the at least one undirected graph to which the multiple primitive beautification action applies.

In an embodiment, at least one segment in the structural representation is identified to which a single primitive beautification action applies. A single primitive beautification action is applied to the at least one identified segment to further generate the beautified raw drawing data.

In an embodiment, applying a multiple primitive beautification action to the adjacent segments to generate beautified raw drawing data includes applying at least one of a snap line action or a perpendicular action to the adjacent segments.

In an embodiment, identifying a set of segments in raw drawing data includes performing uniform distance sampling on the raw drawing data to produce uniform distance sampled drawing data. The uniform distance sampled drawing data is examined to detect corner points. Segments are identified in the uniform distance sampled drawing data based at least upon the detected corner points. Any incorrectly identified segments are removed from the identified segments.

In an embodiment, a system includes at least one processor circuit and at least one memory that stores program code configured to be executed by the at least one processor circuit to perform operations. The operations include identifying a set of segments in raw drawing data. A structural representation is constructed of the set of segments identified in the raw drawing data that specifies a topological relationship between the segments in the set of segments. At least one set of adjacent segments is identified in the structural representation to which a multiple primitive beautification action applies. The multiple primitive beautification action is applied to the adjacent segments to generate multiple primitive beautified drawing data.

In an embodiment, the operation of constructing a structural representation of the set of segments identified in the raw drawing data that specifies a topological relationship between the segments in the set of segments further includes indicating each segment in the set of segments as a vertex. For each vertex, any other vertexes representing segments adjacent to the vertex in the set are indicated. One or more undirected graphs containing the vertexes is constructed that indicates for each vertex any other vertexes representing adjacent segments in the set.

In an embodiment, the operations further include identifying at least one segment in the one or more undirected graphs to which a single primitive beautification action applies and applying a single primitive beautification action to the at least one identified segment to further generate the beautified raw drawing data.

In an embodiment, identifying a set of segments in the raw drawing data includes performing uniform distance sampling on the raw drawing data to generate uniform distance sampled drawing data, detecting corner points in the uniform distance sampled drawing data, identifying segments in the uniform distance sampled drawing data based at least upon the detected corner points, and removing any incorrectly identified segments from the identified segments.

CONCLUSION

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A computing device, comprising:
a drawing beautification engine configured to beautify raw drawing data, the drawing beautification engine including:
  a raw data processor configured to receive the raw drawing data and identify a set of segments in the raw drawing data;
  a beautification director configured to construct a structural representation of the set of segments identified in the raw drawing data that specifies a topological relationship between the segments in the set of segments, the structural representation comprising one or more undirected graphs wherein each vertex thereof corresponds to a segment of the set of segments, and wherein each vertex is connected to every other vertex that corresponds to an adjacent segment in the set of segments;
  a multiple primitive beautifier configured to identify at least one set of adjacent segments in the structural representation to which a multiple primitive beautification action applies; and
  a multiple primitive action applier configured to apply the multiple primitive beautification action to the adjacent segments to generate beautified raw drawing data.

2. The computing device of claim 1, wherein the undirected graph includes a vertex having at least three adjacent vertexes.

3. The computing device of claim 2, wherein the multiple primitive beautifier is configured to apply the multiple primitive beautification policy on each vertex and any adjacent vertexes in the one or more undirected graphs.

4. The computing device of claim 1, wherein the multiple primitive beautifier is configured to apply at least one multiple primitive beautification policy to identify the at least one set of adjacent segments in the structural representation to which the multiple primitive beautification action applies.

5. The computing device of claim 1, wherein the multiple primitive action applier is further configured to increment an order of each segment of the at least one set of adjacent segments each time a multiple primitive beautification action is performed on the respective segment.

6. The computing device of claim 5, wherein the multiple primitive action applier is further configured to apply the multiple primitive beautification action to the adjacent segments such that the amount of alteration of each adjacent segment depends at least in part on the orders corresponding to each segment.

7. The computing device of claim 5, wherein the multiple primitive beautification action comprises joining first and second segments of the at least one set of adjacent segments at a point of proximity.

8. The computing device of claim 7, wherein joining comprises moving, shifting or extending the first segment, the second segment, or both the first and second segments together, a distance required to bring the first and second segments into contact at the point of proximity.

9. The computing device of claim 8, wherein joining further comprises determining how much to move, shift or extend the first and second segments based in part on a comparison of the order corresponding to each segment, wherein the segment with a larger order is determined to move, shift or extend less than the other segment.

10. A method comprising:
identifying a set of segments in raw drawing data;
constructing a structural representation of the set of segments identified in the raw drawing data that specifies a topological relationship between the segments in the set of segments, the structural representation comprising one or more undirected graphs wherein each vertex thereof corresponds to a segment of the set of segments, and wherein each vertex is connected to every other vertex that corresponds to an adjacent segment in the set of segments;
identifying at least one set of adjacent segments in the structural representation to which a multiple primitive beautification action applies; and
applying the multiple primitive beautification action to the adjacent segments to generate multiple primitive beautified drawing data.

11. The method of claim 10, wherein the undirected graph includes a vertex having at least three adjacent vertexes.

12. The method of claim 11 further comprising:
assigning an order to the vertexes of the at least one undirected graph; and
applying at least one multiple primitive beautification policy to the vertexes in the at least one undirected graph based on the assigned order to identify the at least one set of adjacent segments in the at least one undirected graph to which the multiple primitive beautification action applies.

13. The method of claim 10 wherein identifying at least one set of adjacent segments in the structural representation to which a multiple primitive beautification action applies comprises:
for each vertex of the one or more undirected graphs, and for each vertex adjacent to the one vertex being an adjacent vertex, assigning an order to the vertex and the adjacent vertex based at least in part whether the segments corresponding to the adjacent vertex and one or more vertexes adjacent thereto were jointly subject to a previously applied multiple primitive beautification action; and determining whether the segments corresponding to the vertex and the adjacent vertex were jointly subject to a previously applied multiple primitive beautification action;

and wherein applying the multiple primitive beautification action to the adjacent segments comprises:

when it was determined that the segments corresponding to the vertex and adjacent vertex were not jointly subject to a previously applied multiple primitive beautification actions, applying the multiple primitive beautification action to the segments that correspond to the vertex and adjacent vertex based at least in part on the orders assigned thereto.

14. The method of claim 13, wherein the order assigned to the vertex is greater than the order assigned to the adjacent vertex where the segments corresponding to the adjacent vertex and one or more vertexes adjacent thereto were not jointly subject to a previously applied multiple primitive beautification action.

15. The method of claim 13, wherein the order assigned to the vertex is the same as the order assigned to the adjacent vertex where the segments corresponding to the adjacent vertex and one or more vertexes adjacent thereto were jointly subject to a previously applied multiple primitive beautification action.

16. A system comprising:
at least one processor circuit; and
at least one memory that stores program code configured to be executed by the at least one processor circuit to perform operations, the operations comprising:
identifying a set of segments in raw drawing data;
constructing a structural representation of the set of segments identified in the raw drawing data that specifies a topological relationship between the segments in the set of segments, the structural representation comprising one or more undirected graphs wherein each vertex thereof corresponds to a segment of the set of segments, and wherein each vertex is connected to every other vertex that corresponds to an adjacent segment in the set of segments;
identifying at least one set of adjacent segments in the structural representation to which a multiple primitive beautification action applies; and
applying the multiple primitive beautification action to the adjacent segments to generate multiple primitive beautified drawing data.

17. The system of claim 16, wherein wherein the undirected graph includes a vertex having at least three adjacent vertexes.

18. The system of claim 16 wherein the operation of identifying at least one set of adjacent segments in the structural representation to which a multiple primitive beautification action applies comprises:

for each vertex of the one or more undirected graphs, and for each vertex adjacent to the one vertex being an adjacent vertex, assigning an order to the vertex and the adjacent vertex based at least in part whether the segments corresponding to the adjacent vertex and one or more vertexes adjacent thereto were jointly subject to a previously applied multiple primitive beautification action; and determining whether the segments corresponding to the vertex and the adjacent vertex were jointly subject to a previously applied multiple primitive beautification action;

and wherein the operation of applying the multiple primitive beautification action to the adjacent segments comprises:

when it was determined that the segments corresponding to the vertex and adjacent vertex were not jointly subject to a previously applied multiple primitive beautification actions, applying the multiple primitive beautification action to the segments that correspond to the vertex and adjacent vertex based at least in part on the orders assigned thereto.

19. The system of claim 18, wherein the order assigned to the vertex is greater than the order assigned to the adjacent vertex where the segments corresponding to the adjacent vertex and one or more vertexes adjacent thereto were not jointly subject to a previously applied multiple primitive beautification action.

20. The system of claim 19, wherein the order assigned to the vertex is the same as the order assigned to the adjacent vertex where the segments corresponding to the adjacent vertex and one or more vertexes adjacent thereto were jointly subject to a previously applied multiple primitive beautification action.

* * * * *